(No Model.) 2 Sheets—Sheet 1.
W. R. HARRISON.
FEED CUTTER.
No. 577,363. Patented Feb. 16, 1897.
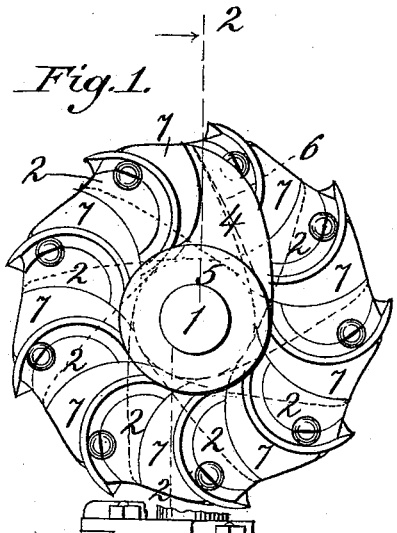
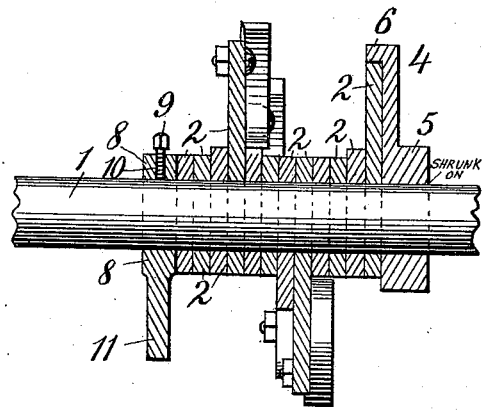
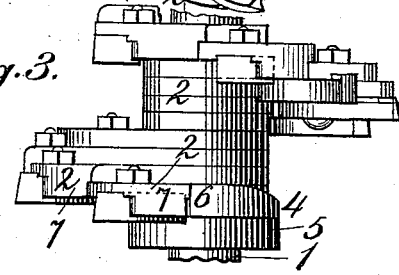
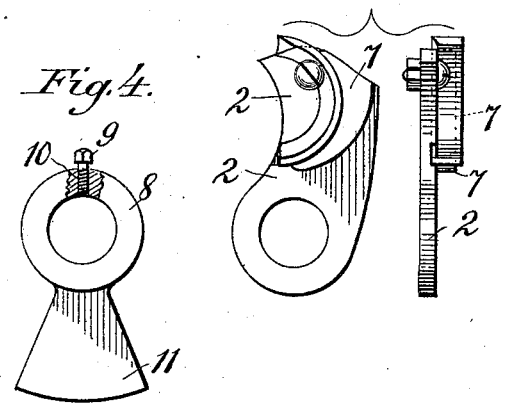
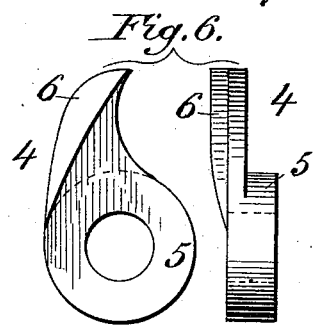
Attest:
F. H. Schott
Albert Popkins
Inventor
W. R. Harrison
By McCleary & Hardcastle
Attys.

(No Model.) 2 Sheets—Sheet 2.
W. R. HARRISON.
FEED CUTTER.
No. 577,363. Patented Feb. 16, 1897.
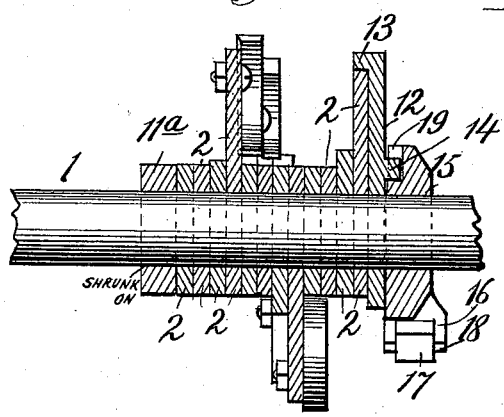
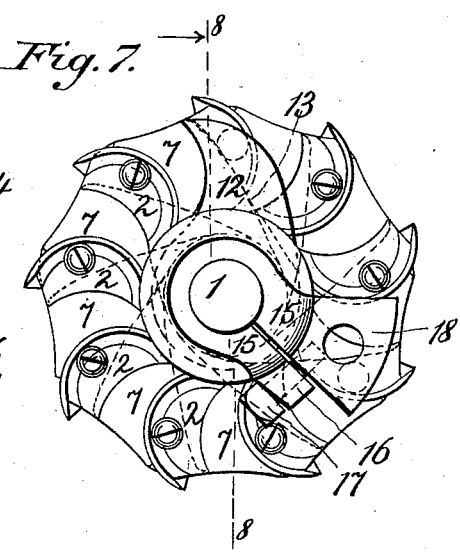
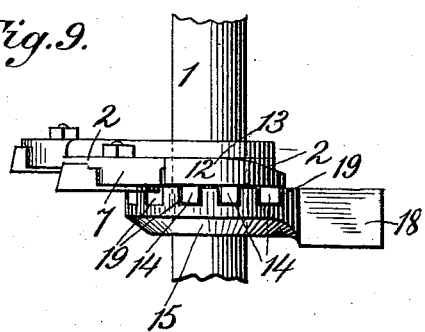
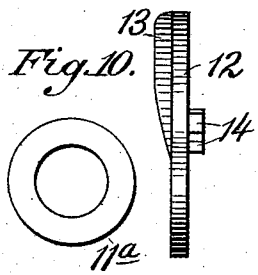
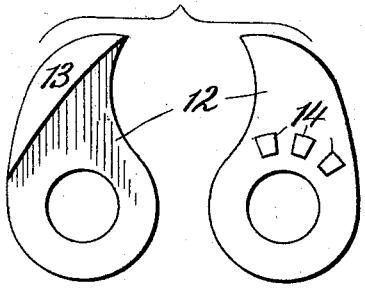
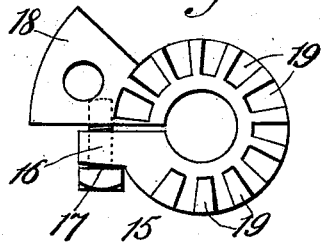
Attest:
F. H. Schott
Albert Popkins
Inventor
W. R. Harrison
By McCleary & Hardcastle
Attys.

UNITED STATES PATENT OFFICE.

WILLIAMSON R. HARRISON, OF MASSILLON, OHIO.

FEED-CUTTER.

SPECIFICATION forming part of Letters Patent No. 577,363, dated February 16, 1897.

Application filed August 22, 1896. Serial No. 603,559. (No model.)

*To all whom it may concern:*

Be it known that I, WILLIAMSON R. HARRISON, a citizen of the United States, residing at Massillon, in the county of Stark and State of Ohio, have invented certain new and useful Improvements in Feed-Cutters; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to certain improvements in feed-cutters, especially adapted for cutting hay, corn-fodder, ensilage, &c.; and the primary object of the invention is to combine with a cutting-cylinder comprising a series of spirally-arranged arms carrying knives or cutters means for securing said arms firmly together upon a supporting-shaft.

A further object of the invention is to provide a cutting-cylinder with an adjustable weight or balancing device to insure the steady revolution of the cylinder and avoid jarring or undue wear upon the machine.

With these ends in view the invention consists in the combinations of parts and features of construction defined in the appended claims and fully described hereinafter.

In the accompanying drawings, which form a part of this specification, Figure 1 is an end elevation of a cutting-cylinder with my improvement applied thereto. Fig. 2 is a longitudinal sectional view of the cylinder. Fig. 3 is a plan view. Fig. 4 is a view of the weighted clamping-ring detached. Fig. 5 illustrates one of the cylinder-segments detached. Fig. 6 illustrates the locking or holding dog. Figs. 7, 8, and 9 are respectively an end view, a longitudinal section, and a plan view of a modified construction of the device; and Figs. 10, 11, 12, and 13 are detail views of parts of the modification shown in Figs. 7, 8, and 9.

The reference-numeral 1 indicates the main shaft of a feed-cutter, upon which the segmental arms 2, carrying knives 3, are supported and secured.

It will be understood that the cutting-cylinder as thus constituted is to be used in combination with a stationary transverse cutter-bar, suitable hand or power gearing, and other features necessary to the organization of an operative machine; but inasmuch as the present invention relates only to the cutting-cylinder and its appurtenances illustration in the drawings of the other well-known parts of the machine is not deemed necessary to a clear understanding of the invention by those skilled in the art to which it pertains.

Referring now to Figs. 1, 2, and 3, the reference-numeral 4 indicates a dog of curved form, provided with a bored hub 5 and a curved web or flange 6. This dog is rigidly secured upon the shaft 1, preferably by being "shrunk" thereon while hot. The first arm 2 is then placed against the dog 4, resting against the flange 6 thereof, as shown, and the remaining arms 2 are then placed upon the shaft, each of said arms being formed with a curved abutting web or flange 7, as shown. After the last arm 2 is in place pressure is applied thereto to force the arms into close frictional contact, and the securing ring-clamp 8 is adjusted to place and held by a screw 9, passing through an opening 10 in the ring and impinging against the shaft 1.

The clamping-ring 8 is provided with an integral lug 11, which serves when properly adjusted to balance the cylinder.

Heretofore the several segmental knife-carrying arms 2 have been held together by forming an opening through the shaft 1 and inserting a cross-pin therein.

Aside from weakening the shaft this fastening means is objectionable for another reason. The arms 2, when their knives become worn, must be removed and replaced by new ones. It frequently happens, owing to slight variations in the thickness of the arms, that when a new set or series is applied to the shaft the pin-opening in the shaft does not register properly with the outer side of the last or outer arm, and thus either the pin cannot be inserted or if inserted does not hold the arms with sufficient rigidity for satisfactory work.

It will be obvious that my improved clamp and weight device will securely hold the knife-arms at any point upon the shaft and that I avoid the serious objection above referred to.

It will also be seen that the weight carried by the ring 8 may be adjusted to the proper point to balance the cylinder and insure steady revolving movement thereof.

In Fig. 4 I have illustrated a modification of the clamping and balancing devices shown in the other figures. In this instance I shrink or otherwise rigidly secure upon the shaft 1 a ring 11ª and build up the spiral cutting-cylinder in the reverse order to that shown in Fig. 1, that is to say, I place the plain or smooth side of the first arm 2 against the ring and the other arms together in like manner, so that the last arm 2 will present its curved flange 7 outwardly. I then apply the dog 12, which is provided with the flange 13 on its inner side and with a series of square projections 14 on its outer side, arranged in arc form, as shown. In lieu of the clamping-ring shown in Figs. 1 to 3 I employ a split ring 15, having an arm extension 16, provided with a set-screw 17, an integral weight 18, and provided on its inner side with a series of radial recesses 19, into which the projections 14 of the dog are adapted to fit.

The clamping-ring 15 is turned to the proper position to balance the cylinder and then forced into engagement with the projections 14 of the dog, after which, by means of the screw 17, the ring is tightly clamped upon the shaft 1.

Having fully described my invention, what I claim as new, and desire to secure by Letters Patent, is—

1. The combination with a cutting-cylinder consisting of a series of spirally-arranged knife-arms supported upon a shaft, of a fixed stop or abutment at one end of the cylinder, and an adjustable clamping-ring at the opposite end said ring carrying a balancing-weight and provided with a set-screw, substantially as described.

2. The combination with a cutting-cylinder comprising cutters spirally arranged upon a shaft, of a fixed stop on the shaft at one end of the cylinder, an adjustable stop at the opposite end of the cylinder, and a weighted clamp interlocking adjustably with said adjustable stop, substantially as described.

3. The combination with the cylinder and its shaft, said cylinder comprising a series of knife-arms, of the adjustable dog provided with projections on its outer side, and an adjustable clamp provided with a weight a clamping-screw, and a series of recesses into which said projections fit, substantially as described.

4. The combination with the cylinder and its shaft, said cylinder comprising a series of knife-arms, of the adjustable dog provided with projections arranged in the arc of a circle, and an adjustable clamp having radially-disposed recesses, substantially as described.

5. The combination with the cylinder and its shaft, said cylinder comprising a series of knife-arms, of the adjustable dog, and an adjustable balance and clamp, consisting of a split ring provided with a clamping-screw and an integral weight, substantially as described.

In testimony whereof I affix my signature in presence of two witnesses.

WILLIAMSON R. HARRISON.

Witnesses:
 F. G. HARRISON,
 F. O. MCCLEARY.